United States Patent [19]

Edmonds, Jr. et al.

[11] 4,089,847
[45] May 16, 1978

[54] TEMPERATURE PROGRAMMING IN THE PRODUCTION OF ARYLENE SULFIDE POLYMERS

[75] Inventors: James T. Edmonds, Jr.; Robert W. Campbell, both of Bartlesville, Okla.

[73] Assignee: Phillips Petroleum Company, Bartlesville, Okla.

[21] Appl. No.: 671,773

[22] Filed: Mar. 30, 1976

[51] Int. Cl.² .................................... C08G 75/16
[52] U.S. Cl. ................................. 260/79.1; 260/79
[58] Field of Search ........................ 260/79, 79.1

[56] References Cited

U.S. PATENT DOCUMENTS

| | | | |
|---|---|---|---|
| 3,354,129 | 11/1967 | Edmonds, Jr. et al. | 260/79 |
| 3,607,843 | 9/1971 | Vidaurri, Jr. | 260/79 |
| 3,699,087 | 10/1972 | Wood et al. | 260/79 |
| 3,725,362 | 4/1973 | Walker | 260/79 |
| 3,737,411 | 6/1973 | Scoggins | 260/79 |
| 3,756,993 | 9/1973 | Green et al. | 260/79 |
| 3,763,124 | 10/1973 | Edmonds, Jr. | 260/79 |
| 3,786,035 | 1/1974 | Scoggin | 260/79 |
| 3,790,536 | 2/1974 | Vidaurri, Jr. | 260/79 |
| 3,919,177 | 11/1975 | Campbell | 260/79 |

Primary Examiner—Melvyn I. Marquis

[57] ABSTRACT

A method is provided in the production of an arylene sulfide polymer by employing a p-dihalobenzene, optionally together with a minor amount of a polyhalo aromatic compound having more than two halogen substituents per molecule; an alkali metal sulfide; an alkali metal carboxylate; a base selected from alkali metal hydroxides and alkali metal carbonates; and an organic amide using a profile of selected temperature ranges within the range of polymerization reaction temperature for the process which results in a polymer of lower melt flow than that of the polymer produced when one polymerization temperature is used throughout the polymerization stage.

10 Claims, No Drawings

TEMPERATURE PROGRAMMING IN THE PRODUCTION OF ARYLENE SULFIDE POLYMERS

BACKGROUND OF THE INVENTION

This invention relates to the production of arylene sulfide polymer. In one of its aspects this invention relates to the production of arylene sulfide polymer having melt flow in the range of about 1 to about 700 as determined by the method of ASTM D 1238-70. In another of its aspects this invention relates to using a profile of selected temperature ranges in the production of arylene sulfide polymer.

In the use of arylene sulfide polymers in applications such as the production of fibers and molded objects, it is often desirable that the arylene sulfide polymer be of lower melt flow, without prior curing, than that of uncured, non-crosslinked arylene sulfide polymer normally obtained in prior art processes. For example, uncured, non-crosslinked arylene sulfide polymers having a melt flow within the range of 1 to about 700 (determined by the method of ASTM D 1238-70, modified to a temperature of 316° C using a 5kg weight, the value being expressed as g/10 min.), are particularly useful in the production of fibers and molded objects since the usual curing step is obviated. In general, fibers produced from uncured, non-crosslinked arylene sulfide polymers of low melt flow exhibit superior tenacity and less embrittlement on thermal aging than do those of higher melt flow, and objects molded from uncured, non-crosslinked arylene suflide polymers of low melt flow have better impact resistance and better dimensional stability than do those of higher melt flow.

It is therefore an object of this invention to provide a method for producing arylene sulfide polymer that in an uncured, non-crosslinked state has a melt flow within the range of about 1 to about 700. It is also an object of this invention to provide polymers produced by the method of this invention. It is still another object of this invention to provide fibers produced from the polymers produced by the method of this invention.

Other aspects, objects and the various advantages of this invention will become apparent upon reading the specification and its appended claims.

STATEMENT OF THE INVENTION

In accordance with this invention, in the production of an arylene sulfide polymer by employing (1) a p-dihalobenzene, optionally together with a minor amount of a polyhalo aromatic compound having more than two halogen substituents per molecule, (2) an alkali metal sulfide, (3) an alkali metal carboxylate, (4) a base selected from alkali metal hydroxides and alkali metal carbonates, and (5) an organic amide, the use of a profile of temperatures as set forth below during the polymerization stage results in a polymer of lower melt flow than that of the polymer produced when essentially one polymerization temperature is used throughout the polymerization stage. Additionally, since the polymerization is an exothermic reaction, the use of a temperature profile as described below permits better control of the temperature, thereby avoiding possible temporary excessive temperatures and excessive pressures.

In one embodiment of the present invention, at least one p-dihalobenzene, optionally together with at least one polyhalo aromatic compound having more than two halogen substituents per molecule, is reacted with a mixture in which at least one alkali metal sulfide, at least one alkali metal carboxylate, at least one base selected from alkali metal hydroxides and alkali metal carbonates, and at least one organic amide are contacted, the reaction of the halogenated aromatic compound(s) with this mixture being conducted within a first temperature range of about 180° C to about 245° C, preferably about 190° C to about 245° C, and then within a second temperature range of about 245° C to about 285° C, preferably about 245° C to about 275° C, the total reaction time for the polymerization in these two temperature ranges being within the range of about 2 to about 12 hours, preferably about 3 to about 10 hours, about 15 to about 70 percent of which time is within the first temperature range, the temperature during at least 50 percent of the reaction time in the first temperature range being at least 20° C below the final temperature in the second temperature range. The reaction times are dependent, in part, on the reaction temperatures. In either or both of the temperature ranges the temperature can be maintained predominantly at selected levels within each of the temperature ranges. The temperature can be increased continuously and held at a selected level within a relatively restricted temperature range, i.e., controlled within a restricted range of fluctuation about a selected temperature, after being increased to that level or the selected level can be a temperature range through which the rate of elevation of temperature is retarded as compared to the rate used in attaining the selected level.

p-Dihalobenzenes which can be employed in the process of this invention can be represented by the formula

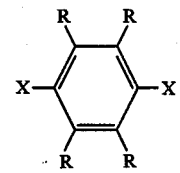

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Polyhalo aromatic compounds having more than two halogen substituents per molecule which optionally can be employed in the process of this invention can be represented by the formula $R'X_n$, where each X is selected from the group consisting of chlorine, bromine, and iodine, $n$ is an integer of 3 to 6, and $R'$ is a polyvalent aromatic radical of valence $n$ which can have up to about 4 methyl substituents, the total number of carbon atoms in $R'$ being within the range of 6 to about 16.

Examples of some polyhalo aromatic compounds having more than two halogen substituents per molecule which can be employed in the process of this invention include 1,2,3-trichlorobenzene, 1,2,4-trichlorobenzene, 1,3-dichloro-5-bromobenzene, 1,2,4-triiodobenzene, 1,2-dibromo-4-iodobenzene, 2,4,6-trichlorotoluene, 1,2,3,5-tetrabromobenzene, hexachlorobenzene, 1,3,5-trichloro-2,4,6-trimethylbenzene, 2,2', 4,4'-tetrachlorobiphenyl, 2,2', 5,5'-tetraiodobiphenyl, 2,2', 6,6'-tetrabromo-3,3', 5,5'-tetramethylbiphenyl, 1,2,3,4-tetrachloronaphthalene, 1,2,4-tribromo-6-methylnaphthalene, and the like, and mixtures thereof.

Alkali metal sulfides which can be employed in the process of this invention include lithium sulfide, sodium sulfide, potassium sulfide, rubidium sulfide, cesium sulfide, and mixtures thereof. The alkali metal sulfide can be used in anhydrous form, as a hydrate, or as an aqueous mixture.

Alkali metal carboxylates which can be employed in the process of this invention can be represented by the formula $R''CO_2M$, where $R''$ is a hydrocarbyl radial selected from alkyl, cycloalkyl, and aryl, and combinations thereof such as alkaryl, aralkyl, and the like, the number of carbon atoms in said $R''$ is within the range of 1 to about 20, and M is an alkali metal selected from lithium, sodium, potassium, rubidium, and cesium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradeconate, sodium octanoate, sodium heneicosanoate, lithium cyclohexanecarboxylate, ceisum cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

As stated previously, the base used in the process of this invention is selected from alkali metal hydroxides and alkali metal carbonates. Examples of some bases which can be employed include lithium hydroxide, sodium hydroxide, potassium hydroxide, rubidium hydroxide, cesium hydroxide, lithium carbonate, sodium carbonate, potassium carbonate, rubidium carbonate, cesium carbonate, and mixtures thereof.

The organic amides for use in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

Although the mole ratio of p-dihalobenzene to alkali metal sulfide can vary over a considerable range, generally it will be within the range of about 0.9:1 to about 2:1, preferably about 0.95:1 to about 1.2:1. The amount of polyhalo aromatic compound having more than two halogen substituents per molecule, if used, can vary considerably, depending in part on the halogen content of said polyhalo aromatic compound, but generally will be up to about 0.6 part by weight, preferably being about 0.1 part by weight to about 0.4 part by weight, per 100 parts by weight p-dihalobenzene. The mole ratio of alkali metal carboxylate to alkali metal sulfide can vary over a wide range but generally will be within the range of about 0.05:1 to about 4:1, preferably about 0.1:1 to about 2:1. Although the mole ratio of base to alkali metal sulfide can vary over a considerable range, generally it will be within the range of about 0.008:1 to about 0.8:1, preferably about 0.015:1 to about 0.6:1. The amount of organic amide can vary greatly, generally being within the range of about 100 grams to about 2500 grams per gram-mole of alkali metal sulfide.

The pressure at which the polymerization reaction is conducted should be sufficient to maintain the p-dihalobenzene, the polyhalo aromatic compound having more than two halogen substituents per molecule, if used, and the organic amide substantially in the liquid phase.

It is to be understood that the process of this invention can be carried out by mixing the p-dihalobenzene, the polyhalo aromatic compound having more than two halogen substituents per molecule, if used, the alkali metal sulfide, the alkali metal carboxylate, the base, and the organic amide in any order. It is also to be understood that a composite can be formed of any two or more of these substances with the remaining substance or substances being introduced into the composite. Furthermore, it is to be understood that these substances can be employed in the form of aqueous mixtures or hydrates and that subsequent to any step of contacting substances water can be removed from the resulting composition, e.g., by distillation. For instance, water can be removed by distillation from a mixture of the organic amide, the base, the alkali metal carboxylate, e.g., as a hydrate, and the alkali metal sulfide in hydrated form or as an aqueous mixture, after which the residual mixture can be admixed with the p-dihalobenzene and the polyhalo aromatic compound having more than two halogen substituents per molecule, if used, and the resulting mixture then subjected to the polymerization conditions of the invention. When a considerable amount of water is present in components as free water and water of hydration, it is sometimes desirable to remove water in more than one dehydration step. For example, when the alkali metal sulfide is used as an aqueous solution prepared by admixing an aqueous solution of sodium hydroxide with an aqueous solution of sodium bisulfide and the alkali metal carboxylate is employed as a hydrate or as an aqueous solution or slurry, water can be distilled from a mixture of the alkali metal carboxylate and the organic amide in one dehydration step, the aqueous solution of alkali metal sulfide can be added to the residual mixture, and water can be distilled from the resulting mixture in a second dehydration step, after which the residual mixture can be admixed with the halogenated aromatic compound(s) and the polymerization allowed to proceed under the reaction conditions of the invention. It is presently preferred that at least one dehydration step be employed. When a polyhalo aromatic compound having more than two halogen substituents per molecule is employed, it can be added at substantially the same time as the p-dihalobenzene, or it can be added during the course of the polymerization.

The arylene sulfide polymers produced by the process of this invention can be separated from the reaction mixture by conventional procedures, e.g., by filtration of the polymer, followed by washing with water or by dilution of the reaction mixture with water, followed by filtration and water washing of the polymer. Alternatively, organic amide can be recovered by distillation from the reaction mixture prior to washing with water. When this latter procedure is employed, and the organic amide is distilled at elevated temperatures, e.g., above 200° C, it is preferable that carbon dioxide be added during the polymerization reaction or upon completion of the polymerization reaction, but prior to distillation of the organic amide, to inhibit decomposition of the arylene sulfide polymer during distillation of the organic amide.

The arylene sulfide polymers produced by the process of this invention can be blended with fillers, pigments, extenders, other polymers, and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, films, molded objects, and fibers. Those arylene sulfide polymers having a relatively low melt flow, e.g., within the range of about 1 to about 700 (determined by the method of ASTM D 1238-70, modified to a temperature of 316° C using a 5-kg weight, the value being expressed as g/10 min.), are particularly useful in the production of fibers, molded objects, and films since the usual curing step is obviated.

EXAMPLES

In the following Examples, melt flow values were determined by the method of ASTM D 1238-70, modified to a temperature of 600° F (316° C) using a 5-kg weight, the value being expressed as g/10 min. Values for inherent viscosity were determined at 206° C in 1-chloronaphthalene at a polymer concentration of 0.4 g/100 ml solution. Values for glass transition temperature ($T_g$) and crystalline melting point ($T_m$), when obtained, were determined on premelted and quenched polymer samples by differential thermal analysis.

EXAMPLE I

In a control run outside the scope of this invention, 64.7g (59.5 percent assay, 0.5 mole) sodium sulfide, 4.4g (0.1 mole) sodium hydroxide, 51.0g (0.5 mole) lithium acetate dihydrate, and 158.3g N-methyl-2-pyrrolidone were charged to a stirred 1-liter autoclave, which was then flushed with nitrogen. Dehydration of the mixture by heating to 205° C yielded 37 ml of distillate containing 31.7g water. To the residual mixture were charged 76.44g (0.52 mole) p-dichlorobenzene, 0.12g (0.00075 mole) 1,2,4-trichlorobenzene, and 40g N-methyl-2-pyrrolidone. The resulting mixture was heated to 265° C during 20 minutes and maintained at that temperature for 4 hours at a pressure of 85-115 psig. The reaction product was washed eight times with hot water and dried at 80° C under nitrogen in a vacuum oven to obtain a yield of 48.1g of branched poly(phenylene sulfide) having a melt flow of 95, an inherent viscosity of 0.28, a $T_g$ of 90° C, and a $T_m$ of 284° C.

EXAMPLE II

In a run within the scope of this invention, 64.7g (59.5 percent assay, 0.5 mole) sodium sulfide, 4.4g (0.1 mole) sodium hydroxide, 51.0g (0.5 mole) lithium acetate dihydrate, and 158.3g N-methyl-2-pyrrolidone were charged to a stirred 1-liter autoclave, which was then flushed with nitrogen. Dehydration of the mixture by heating to 205° C yielded 38 ml of distillate containing 29.3g water. To the residual mixture were charged 76.44g (0.52 mole) p-dichlorobenzene, 0.12g (0.00075 mole) 1,2,4-trichlorobenzene, and 40g N-methyl-2-pyrrolidone. The resulting mixture was heated for 1 hour at 205° C, at the end of which time the pressure was 40 psig. The mixture was then heated during a period of 25 minutes to 265° C, at which temperature the mixture was maintained for 3 hours at a pressure of 90-125 psig. The reaction product was washed eight times with hot water and dried at 80° C under nitrogen in a vacuum oven to obtain a yield of 48.2g of branched poly(phenylene sulfide) having a melt flow of 86, an inherent viscosity of 0.28, a $T_g$ of 91° C, and a $T_m$ of 285° C.

Thus, the melt flow of the branched poly(phenylene sulfide) produced in this Example was less than that of the branched poly(phenylene sulfide) produced in Example I.

EXAMPLE III

In a control run outside the scope of this invention, 983.7g (60 percent assay, 7.56 moles) sodium sulfide, 46.8g (1.17 moles) sodium hydroxide, 765g (7.50 moles) lithium acetate dihydrate, and 3000 ml (3078g) N-methyl-2-pyrrolidone were charged to a stirred 2-gallon reactor, which was then flushed with nitrogen. The mixture was dehydrated by heating to 402° F (206° C), giving 615 ml of distillate comprising primarily water. To the residual mixture were charged 1137g (7.73 moles) p-dichlorobenzene and 500 ml (513g) N-methyl-2-pyrrolidone, whereupon the temperature dropped to about 385° F (196° C). The resulting mixture was heated to about 490° F (254° C) during about 25 minutes, at which temperature the mixture was maintained, with cooling, for about 15 minutes, after which the temperature was raised to about 510° F (266° C) during about 5 minutes. The resulting mixture was then heated for about 4 hours at about 510° F (266° C) at a maximum pressure of 160 psig. The reaction product was cooled, washed four times with water, and dried in a vacuum oven to obtain 699.9g poly(p-phenylene sulfide) having a melt flow of 169 and an inherent viscosity of 0.32.

EXAMPLE IV

In a run within the scope of this invention, 983.7g (60 percent assay, 7.56 moles) sodium sulfide, 46.8g (1.17 moles) sodium hydroxide, 765g (7.50 moles) lithium acetate dihydrate, and 3000 ml (3078g) N-methyl-2-pyrrolidone were charged to a stirred 2-gallon reactor, which was then flushed with nitrogen. The mixture was dehydrated by heating to 402° F (206° C), giving 635 ml of distillate comprising primarily water. To the residual mixture were charged 1137g (7.73 moles) p-dichlorobenzene and 500 ml (513g) N-methyl-2-pyrrolidone, whereupon the temperature dropped to about 375° F (191° C). The resulting mixture was heated to about 400° F (204° C) during about 5 minutes, at which temperature it was maintained for about 1 hour. The mixture was then heated to about 490° F (254°C) during about 25 minutes, and then to about 510° F (266° C) during about 30 minutes, after which the temperature was maintained at about 510° F (266° C) for about 3 hours, the maximum pressure being 170 psig. The reaction product was cooled, washed four times with water, and dried in a vacuum oven to obtain 726.7g poly(p-phenylene sulfide) having a melt flow of 138 and an inherent viscosity of 0.34.

In a duplicate run conducted in essentially the same way, there was obtained 707.1g poly(p-phenylene sulfide) having a melt flow of 114 and an inherent viscosity of 0.32.

Thus, the melt flow of the poly(p-phenylene sulfide) produced in each of the duplicate runs in this Example was less than that of the poly(p-phenylene sulfide) produced in Example III.

We claim:

1. In the production of an arylene sulfide polymer by reacting (1) at least one p-dihalobenzene or at least one p-dihalobenzene together with at least one polyhalo aromatic compound having more than two halogen substituents per molecule with (2) a mixture in which (a) at least one alkali metal sulfide, (b) at least one alkali metal carboxylate, (c) at least one base selected from alkali metal hydroxides and alkali metal carbonates, and (d) at least one organic amide are contacted a method in which the reaction of halogenated aromatic compound with said mixture is conducted in a profile of selected temperature ranges within the range of polymerization reaction temperature for the process and wherein the temperature during at least 50 percent of the reaction time in a first selected temperature range is at least 20° C below the final temperature in a second selected temperature range.

2. A method of claim 1 wherein about 15 percent to about 70 percent of the total reaction time is within the first selected temperature range.

3. A method of claim 2 wherein the first selected temperature range is about 180° C to about 245° C and the second selected temperature range is about 245° C to about 285° C.

4. A method of claim 3 wherein the first selected temperature range is about 190° C to about 245° C and the second selected temperature range is about 245° C to about 275° C.

5. A method of claim 2 wherein the total reaction time for the polymerization is within the range of about 2 to about 12 hours.

6. A method of claim 5 wherein the total reaction time for the polymerization is within the range of about 3 to about 10 hours.

7. A method of claim 1 wherein said selected temperature level is controlled within a restricted range of fluctuation about a selected temperature.

8. A method of claim 1 wherein said selected temperature level is a temperature range through which the rate of temperature elevation is retarded as compared to a rate of temperature elevation used in attaining the selected level.

9. A method of claim 7 wherein said p-dihalobenzene is p-dichlorobenzene, said polyhalo aromatic compound having more than two halogen substituents per molecule is 1,2,4-trichlorobenzene, said alkali metal sulfide is sodium sulfide, said alkali metal carboxylate is lithium acetate dihydrate, said base is sodium hydroxide, said organic amide is N-methyl-2-pyrrolidone, said first selected temperature level is about 205° C and said second selected temperature level is about 265° C.

10. A method of claim 7 wherein said p-dihalobenzene is p-dichlorobenzene, said alkali metal sulfide is sodium sulfide, said alkali metal carboxylate is lithium acetate dihydrate, said base is sodium hydroxide, said organic amide is N-methyl-2-pyrrolidone, said first selected temperature level is about 204° C and said second selected temperature level is about 266° C.

* * * * *